(12) United States Patent
Schmitt

(10) Patent No.: US 6,802,360 B1
(45) Date of Patent: Oct. 12, 2004

(54) HEAT EXCHANGER FOR THE EVAPORATION OF WATER FROM POND LIQUID AND METHOD THEREFOR

(75) Inventor: Ralph J. Schmitt, Thousand Oaks, CA (US)

(73) Assignee: Envirosolve Corporation, Agoura Hills, CA (US)

( * ) Notice: Subject to any disclaimer, the term of this patent is extended or adjusted under 35 U.S.C. 154(b) by 0 days.

(21) Appl. No.: 10/218,266

(22) Filed: Aug. 13, 2002

(51) Int. Cl.$^7$ ............................................. F28D 21/00
(52) U.S. Cl. ................................... 165/45; 62/260
(58) Field of Search ............................ 165/45; 62/260

(56) References Cited

U.S. PATENT DOCUMENTS

| | | | | | |
|---|---|---|---|---|---|
| 2,561,932 A | * | 7/1951 | Landgraf | ...................... | 119/73 |
| 3,878,887 A | * | 4/1975 | Best | ...................... | 165/45 |
| 4,254,818 A | * | 3/1981 | Melamed | ...................... | 165/45 |
| 4,258,780 A | * | 3/1981 | Suo | ...................... | 165/45 |
| 4,360,004 A | * | 11/1982 | Testolini | ...................... | 126/565 |
| 4,440,148 A | * | 4/1984 | Assaf | ...................... | 126/567 |
| 4,475,535 A | * | 10/1984 | Assaf | ...................... | 126/568 |
| 4,510,920 A | * | 4/1985 | Walmet | ...................... | 126/561 |
| 4,658,868 A | * | 4/1987 | Word | ...................... | 141/11 |
| 4,719,759 A | * | 1/1988 | Zaslavsky | ...................... | 165/45 |
| 4,781,029 A | * | 11/1988 | SerVaas | ...................... | 60/641.7 |
| 4,842,049 A | | 6/1989 | Dodds | | |
| 5,220,792 A | * | 6/1993 | Doron et al. | ............... | 60/641.5 |
| 5,983,889 A | * | 11/1999 | Thomas | ................... | 126/351.1 |

* cited by examiner

*Primary Examiner*—Terrell McKinnon
(74) *Attorney, Agent, or Firm*—Jack C. Munro

(57) ABSTRACT

A floating heat exchanger for pond liquid and a method of evaporating water from the pond liquid that utilizes a mass of pipes that are floated at or just below the surface of the pond liquid with one end of the pipes being connected to an inlet manifold and the opposite end of the pipes connected to an outlet manifold. The pipes and manifolds are part of a heated closed loop heat transfer fluid system. The pond liquid is raised in temperature which facilitates the evaporation of water and the concentration of dissolved or suspended solids within the pond liquid.

11 Claims, 1 Drawing Sheet

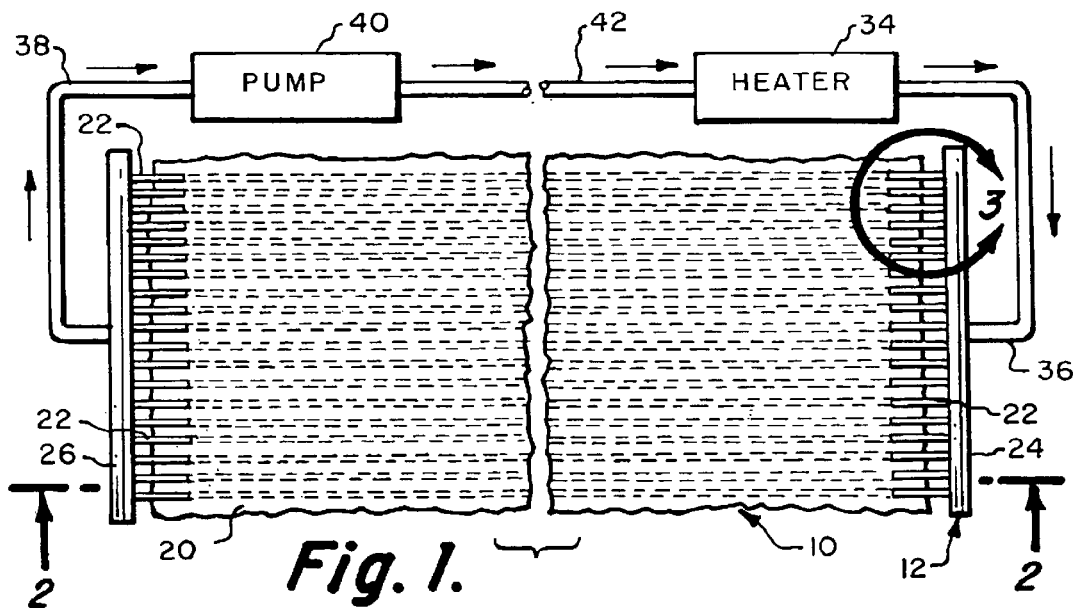
Fig. 1.
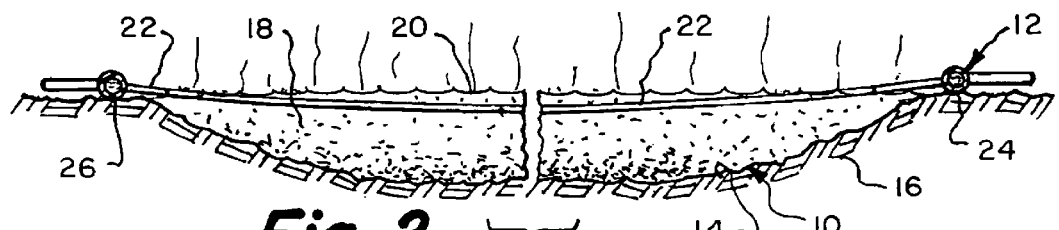
Fig. 2.
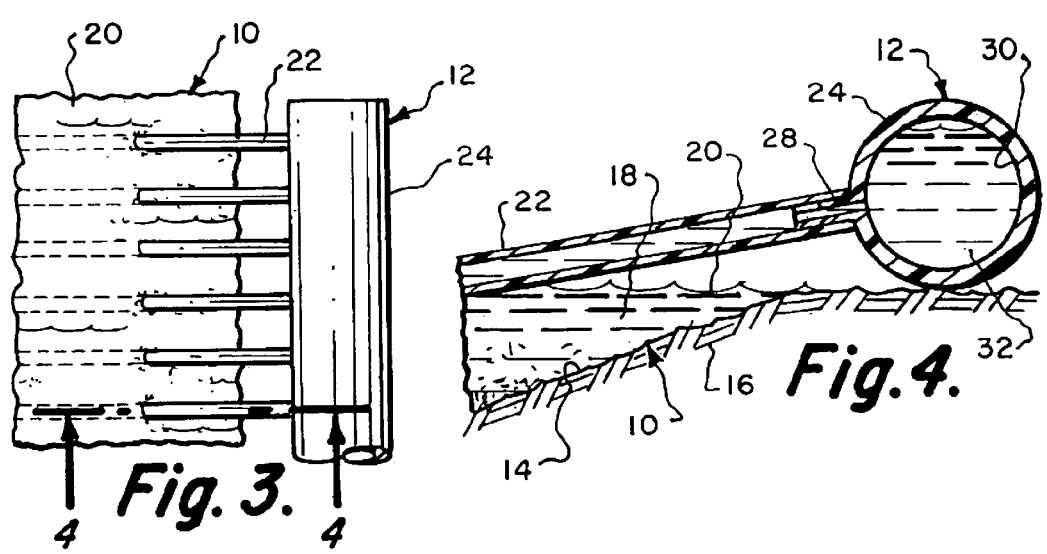
Fig. 3.
Fig. 4.

HEAT EXCHANGER FOR THE EVAPORATION OF WATER FROM POND LIQUID AND METHOD THEREFOR

BACKGROUND OF THE INVENTION

1. Field of the Invention

This invention relates to a heat exchanger to raise the temperature of a pond liquid for the purpose of evaporating water from the pond liquid and precipitating therefrom salts to be extracted and disposed of or recycled.

2. Description of the Related Art

The present invention has been found to be especially useful in conjunction with a landfill. However, the heat exchanging structure of the present invention could be employed advantageously in environments other than landfills, and actually in conjunction with any environment where it is desirable to remove water from a liquid mixture thereby forming a precipitate of what was previously dissolved or suspended solids and then removing of that concentrated solid. In certain areas of the country where there is no access to ocean discharge, there is an accumulation of water in conjunction with certain endeavors where this water is contaminated and contains salts. Agricultural drainage water, oil and gas well production water, reverse osmosis concentrate, cooling tower blow down, demineralizer regeneration waste, and similar high solids content liquid wastes are generally reintroduced to surface water or ground water without any kind of solids removal treatment. This placing of such liquid wastes on or within the ground is starting to become a not-permitted technique for disposal of such liquid wastes and other ways are being considered to dispose of such liquid wastes. In conjunction with landfills, there is created liquid (leachate) in landfills which is a combination of pollutants from the landfill and rainwater. This leachate is being extracted and placed within a pond located on the surface of the ground. It is intended for the pond to receive heat from the sun and evaporate the water from the pond hopefully leaving a concentrated mixture of dissolved and suspended solids. This concentrated mixture from which all water may have been evaporated is then to be transported to an appropriate land disposal area or a user of the recycled solids.

The problem is that in some environments it is difficult for this water to be evaporated from the pond. Rainwater will accumulate in the pond and frequently more water is accumulated than extracted and the pond can actually overflow. There is a need to increase the evaporation rate of the water within this liquid mixture that is contained within the pond. At the present time, there is no known system that is currently in use that facilitates this evaporation without promoting removal of some of the solid material from the pond. The principal invention is designed to use a low grade heat in order to facilitate this evaporation. The use of the low grade heat to evaporate a liquid mixture within an impoundment is generally defined within U.S. Pat. No. 6,276,872 by the present inventor. The aforementioned patent is directed to the including of a closed heat pipe system within the impoundment for the purpose of raising the liquid temperature of the liquid waste material that is contained within the impoundment. This closed heat pipe system is mounted at the bottom of the impoundment.

The evaporation structure of the aforementioned patent locates the heating system along the bottom of the impoundment. It has been discovered that maximum efficiency for evaporation could be obtained if the heat pipe system could be located directly adjacent the surface of the impoundment rather than at the bottom.

The volume of saline production water from oil and gas wells in New Mexico, Wyoming and Colorado is more than twenty million gallons per day. The volume of saline agricultural drainage water from just the Coachella and Imperial Valleys of California is greater. Some lakes, such as the Salton Sea, have exceedingly high concentration of salts. There is a long sought need to produce an economic way to desalt this water in order to produce a potable quality water and a dry salt cake residue that is suitable to be disposable in a secure landfill or used to extract and recycle minerals. Although it is not necessary that the evaporated water is to be recovered as the water can just be disposed of within the air, it is also considered to be within the scope of this invention that the evaporated water can be condensed and then use as a fresh water resource.

SUMMARY OF THE INVENTION

The first basic embodiment of the present invention utilizes a floating heat exchanger which comprises a plurality of elongated pipes mounted between an inlet manifold and an outlet manifold submerged within pond liquid within a pond. The pipes are part of a closed loop system for transporting of heat transfer fluid through the pipes. The pipes are to be placed within the pond liquid. The closed loop system includes a pump and a heater or heat exchanger for moving of the heated heat transfer fluid through the closed loop system to transfer heat to the heat transfer fluid and the floating heat exchanger is to transfer the heat from the heat transfer fluid to the pond. The pond liquid is raised in temperature by heat from the floating heat exchanger to expedite evaporation of water from the pond liquid and the concentration of solids suspended or dissolved in the pond liquid.

A further embodiment of the present invention is where the first basic embodiment is modified by both the inlet manifold and the outlet manifold are located adapted to be exteriorly but adjacent to the pond liquid.

A further embodiment of the present invention is where the first basic embodiment is modified by the pipes being located parallel to each other.

A further embodiment of the present invention is where the first basic embodiment is modified by the pipes being constructed of an adhesion resistant material to deter the accumulation of concentrated solids (scale) thereon.

A further embodiment of the present invention is where the just previous embodiment is modified by the material of the pipes comprising polyethylene.

A second basic embodiment of the present invention comprises utilizing of a pond that contains the pond liquid composed of water and suspended or dissolved solids. The pond liquid has a surface. A floating heat exchanger which comprises a plurality of elongated pipes are placed within the pond liquid and located directly adjacent the surface. One end of the pipes is connected to an inlet manifold, and the opposite end of the pipes is connected to an outlet manifold. Heated heat transfer fluid is pumped through the pipes and the manifolds. The pond liquid is then raised in temperature to expedite evaporation of water from the pond liquid and the concentration of dissolved and suspended solids therein.

A further embodiment of the present invention is where the second basic embodiment is modified by the inlet manifold and outlet manifold being located exteriorly of the pond.

A further embodiment of the present invention is where the second basic embodiment is modified by the pipes being located parallel to each other.

A further embodiment of the present invention is where the second basic embodiment is modified by the pipes being constructed of an adhesion resistant material to deter accumulation of concentrated solids (scale) thereon.

A further embodiment of the present invention is where the just previous embodiment is modified by the material of construction of the pipes comprising a polyethylene.

A third basic embodiment of the present invention comprises a method of evaporating water from a pond that contains a liquid mixture of water and dissolved or suspended solids which comprises the steps of placing a pipe within the pond, flowing a heated heat transfer fluid in a closed loop system through the pipe thereby raising the temperature of the liquid mixture facilitating evaporation of water and concentration of dissolved or suspended solids.

A further embodiment of the present invention is where the third basic embodiment is modified by the pipes being floated upon the evaporating liquid.

A further embodiment of the present invention is where the third basic embodiment is modified by the pipes being constructed of a material that resists the accumulation of concentrated solids or scale thereon which can diminish the flow rate of heat and decrease the overall efficiency of the evaporation system.

A further embodiment of the present invention is where the just previous embodiment is modified by the pipes being constructed of polyethylene.

A further embodiment of the present invention is where the third basic embodiment is modified by constructing the closed loop system to have not only a single pipe but a plurality of pipes interconnected between an inlet manifold and an outlet manifold.

A further embodiment of the present invention is where the third basic embodiment is modified by including a pump and a heater or heat exchanger in the closed loop system.

BRIEF DESCRIPTION OF THE DRAWING

For a better understanding of the present invention, reference is to be made to the accompanying drawing. It is to be understood that the present invention is not limited to the precise arrangement shown in the drawing.

FIG. 1 is a top plan schematic view of the pond floating heat exchanger of the present invention showing such being mounted in conjunction with a pond;

FIG. 2 is a transverse cross-sectional view taken along line 2—2 of FIG. 1 showing in more detail the construction of the floating heat exchanger of the present invention;

FIG. 3 is an enlarged view of a portion of the floating heat exchanger of the present invention taken along line 3—3 of FIG. 1;

FIG. 4 is a cross-sectional view through one of the pipes included within the floating heat exchanger and the inlet manifold of the present invention taken along line 4—4 of FIG. 3.

DETAILED DESCRIPTION OF THE INVENTION

Landfills contain a wide variety of waste including organic waste, some of which undergo anaerobic decomposition of organic material or garbage decay. When liquids, such as rainwater and ground water, come into contact with these wastes, a leachate is formed. Leachates generally contain high concentration of various contaminants such as ammonia nitrogen compounds, inorganic salts, volatile organic compounds and heavy metals. Disposal of untreated leachate having these high concentrations of contaminants are hazardous not only to humans but also to animals and fish. As a result, state and federal regulations are now imposing stringent standards for collecting and treating of this leachate.

The subject matter of the present invention is involved in a research and development program. The object of this program is to show that useful rates of evaporation from a volume of liquid mixture can be obtained by using low grade or waste heat as well as more expensive types of heat from commercial grade fuels. Another objective of this program is to show that the liquid mixture can have water that can be continuously evaporated therefrom with the contaminants being concentrated which then can be removed and recycled or disposed of in a desirable manner. The low grade heat evaporation process of the present invention offers a low cost method of evaporating water from a liquid mixture, and when properly operated it can also be used to recover concentrated solids such as sodium sulphate as a byproduct suitable for reprocessing to obtain industrial quality sodium sulphate. The present invention is believed to be usable effectively for a desalting treatment of water from the Salton Sea or agricultural drainage water within agricultural areas of the United States.

The subject matter of the present invention comprises a method and structure for increasing the natural rate of evaporation from a pond which is subjected to solar energy by heating the surface layer of water within the pond. The vapor pressure of the heated surface layer of the pond water increases exponentially with temperatures so that useful rates of evaporation can be achieved at less than boiling temperatures. A test pond was constructed of twenty square feet surface area and was fitted with a floating heat exchanger constructed in accordance with this invention. The heat exchanger exhibited eighty square feet of surface area. A similar pond was constructed that did not include the heat exchanger. Water was circulated through the heat exchanger and heated by a flat plate solar collector. The water was circulated by a centrifugal pump. Water temperatures in both ponds were monitored with bi-metal strip thermometers. The thermometers were calibrated to have identical readings at seventy degrees Fahrenheit. The maximum water temperature in the heated pond was ninety-nine and one-half degrees Fahrenheit compared to seventy-seven degrees Fahrenheit in the unheated pond. The water temperature in the flat plate solar collector was one hundred eleven degrees Fahrenheit. It was discovered that the water evaporation rate from the heated pond was greater than six times the evaporation from the unheated pond.

Referring particularly to the drawing, there is shown in FIG. 2 a pond 10 that has mounted therewith the heat exchanger 12 of this invention. The pond 10 is shown being formed as a shallow depression 14 within ground 16. A liquid mixture 18 is to be supplied within the pond 10. The liquid mixture 18 is to be comprised of water and dissolved or suspended solids. The dissolved or suspended solids may or may not include contaminants.

The pond 10 has a surface 20 and a bottom which is located at the surface of the shallow depression 14. The heat exchanger 12 is constructed of a plurality of pipes 22. There are nineteen in number of the pipes shown in FIG. 1. However, this number can be substantially increased or decreased without departing from the scope of this invention. Normally, the pipes 22 are mounted in an evenly spaced apart arrangement, although this is not mandatory. A typical internal diameter of the pipes 22 would be about three-quarters of an inch. Typical length of the pipes 22 might be as great as five hundred feet. However, any length greater than a few feet could be utilized. One end of the pipes 22 connects with an inlet manifold 24. The opposite end of the pipes 22 connect with an outlet manifold 26. Basically, the manifolds 24 and 26 are identical. Each manifold 24 and 26, which is usually constructed of plastic, includes a plurality of outwardly protruding nubs 28 through which there is a through opening which connects with the internal chamber 30 of either the inlet manifold 24 or the outlet manifold 26. Contained within the internal chamber 30 is heat transfer fluid which may be water 32. The heat transfer fluid 32 within the inlet manifold 24 is to be conducted through each of the nubs 28 with each nub 28 to be connected to a pipe 22 which results in the heated heat transfer fluid being transported through each of the pipes 22. Each of the pipes 22 is placed within the liquid mixture 18. Each of the pipes 22 is to be constructed of an adhesion resistant material, is such as a polyethylene. This type of material also floats upon water with the result that the pipes will assume a floating configuration with the vast majority of the length of each of the pipes 22 being located at or just below the surface 20 of the liquid mixture 18. Another reason for the selection of polyethylene is that the inherent adhesion resistance of this material resists the accumulation of scale, which is concentrated solids, on the exterior surface of the pipes 22. However, if some scale does accumulate on the pipes 22, it can be readily dislodged by the pipes 22 being shaken. The pipes 22 can also readily deform and, if for some reason there is a substantial amount of accumulated concentrated solids, the pipes 22 could be deformed order to remove the concentrated solids as the polyethylene is readily flexible.

The heat transfer fluid 32 is to be heated by heater or heat exchanger 34 and transported by inlet pipe 36 to the inlet manifold 24. The heat exchanger 34 can take any of numerous forms. One such form would be a solar collector. However, a combustion type of heater or heat exchanger to transfer low-grade heat from another source could also be used. Typically, the temperature of the heat transfer fluid 32 that enters the manifold 24 will generally be between one hundred and one hundred seventy degrees Fahrenheit.

The function of the heat transfer fluid 32 as it is transported through each of the pipes 22 is to raise the temperature level of the liquid mixture 18 directly adjacent the surface 20 by the transfer of heat through the walls of the pipes 22 to the surface 20 of the liquid mixture. The fact that the pipes 22 are located so near the surface 20 that the temperature of the liquid mixture 18 within the pond 10 is greatest at the surface 20. Therefore, maximum evaporation efficiency is obtained because the entire temperature of the pond is not raised nor is the increasing of the temperature of the liquid mixture 18 achieved by a piping system which is located along the surface of the shallow depression 14. In other words, maximum efficiency is obtained by this location of the pipes 22 directly adjacent the surface 20.

The heat transfer fluid 32 from the outlet manifold 26 is conducted into an outlet pipe 38. The outlet pipe 38 connects to a pump 40. Typically, the pump 40 will comprise a centrifugal pump. From the pump 40 the heat transfer fluid 32 is moved through connecting pipe 42 to the heater or heat exchanger 34. Therefore, it can be seen that the pipes 36, 38 and 42 along with manifolds 24 and 26, pipes 22, heater or heat exchanger 34 and pump 40 comprise a closed loop system for the heat transfer fluid 32.

What is claimed is:

1. A floating heat exchanger for a pond liquid within a pond comprising:

a plurality of elongated pipes mounted between an inlet manifold and an outlet manifold;

said pipes being part of a closed loop system for transporting of heat transfer fluid through said pipes, said pipes adapted to be placed within the pond liquid;

said closed loop system including a pump and a heater or heat exchanger for moving of said heated heat transfer fluid through said closed loop system; and whereby the pond liquid is raised in temperature to expedite evaporation of water from the pond liquid and precipitation of salts from the pond liquid.

2. The floating heat exchanger as defined in claim 1 wherein:

both said inlet manifold and said outlet manifold located exteriorly of but adjacent to the pond liquid.

3. The floating heat exchanger as defined in claim 1 wherein:

said pipes being located parallel to each other.

4. The floating heat exchanger as defined in claim 1 wherein:

said pipes being constructed from a material that has a naturally adhesion resistant surface which makes it resistant from surface fouling with concentrated solids.

5. The floating heat exchanger as defined in claim 4 wherein:

said material comprising polyethylene.

6. In combination with a pond that contains a pond liquid composed of water with suspended or dissolved solids and salts, said pond liquid having a bottom located directly adjacent a bottom wall of said pond and a surface spaced furthest from said bottom, a floating heat exchanger for said pond comprising:

a plurality of elongated pipes placed within said pond liquid and located directly adjacent said surface, each of said pipes having a first end and a second end;

an inlet manifold connected to said first end of said pipes, an outlet manifold connected to said second end of said pipes, heated heat transfer fluid to be transported by a pump through said pipes and said first manifold and said second manifold and also through a heater to raise the temperature of said heated transfer fluid; and whereby said pond liquid is raised in temperature to expedite evaporation of water from said pond liquid and concentration of dissolved and suspended solids from said pond liquid.

7. The combination as defined in claim 6 wherein:

said first manifold and said second manifold located exteriorly of said pond liquid.

8. The combination as defined in claim 6 wherein:

said pipes being located parallel to each other.

9. The combination as defined in claim 6 wherein:

said pipes being constructed from a material that has a naturally adhesion resistant surface which makes it resistant from surface fouling with concentrated dissolved or suspended solids.

10. The combination as defined in claim 9 wherein:

said material comprising polyethylene.

11. A method of evaporating water from a pond that contains a liquid mixture of water and dissolved or suspended solids comprising the steps of:

placing a pipe within the pond by floating of said pipe within the pond liquid;

flowing heated heat transfer fluid in a closed loop system through said pipe;

raising the temperature of the liquid mixture facilitating the evaporation of water and concentration of dissolved or suspended solids from the liquid mixture; and the placing step comprises floating of said pipe within the pond liquid.

\* \* \* \* \*